(12) United States Patent
Mahajan et al.

(10) Patent No.: US 6,735,201 B1
(45) Date of Patent: May 11, 2004

(54) EFFICIENT NETWORK MULTICAST SWITCHING APPARATUS AND METHODS

(75) Inventors: Umesh Mahajan, Fremont, CA (US); Ramana Mellacheruvu, Sunnyvale, CA (US); Thomas J. Edsall, Mountain View, CA (US); Raymond Kloth, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/238,422

(22) Filed: Sep. 10, 2002

Related U.S. Application Data

(63) Continuation of application No. 09/167,682, filed on Oct. 7, 1998.

(51) Int. Cl.[7] .......................... H04L 12/28; H04L 12/56
(52) U.S. Cl. ....................................................... 370/390
(58) Field of Search ................................ 370/389, 390, 370/400, 907, 465, 254

(56) References Cited

U.S. PATENT DOCUMENTS

| | | | | |
|---|---|---|---|---|
| 6,101,180 A | * | 8/2000 | Donahue et al. | 370/352 |
| 2003/0016624 A1 | * | 1/2003 | Bare | 370/217 |

* cited by examiner

Primary Examiner—Dang Ton
Assistant Examiner—Kevin C. Harper
(74) Attorney, Agent, or Firm—Cesari and McKenna, LLP

(57) ABSTRACT

Efficient switched network multicasting techniques are provided. Incoming multicast packets are processed by a central forwarding engine (CFE) in a network switch to generate forwarding indices used to make forwarding decisions for the packets based upon whether the packets are special multicast control packets or data packets. Forwarding of the special multicast control packets is determined by the switch's network management processor (NMP), while data packets are forwarded based upon conventional bridge forwarding techniques.

16 Claims, 5 Drawing Sheets

EFFICIENT NETWORK MULTICAST SWITCHING APPARATUS AND METHODS

CROSS-REFERENCE TO RELATED APPLICATIONS

This application is a continuation of U.S. patent application Ser. No. 09/167,682 filed Oct. 7, 1998, entitled "EFFICIENT NETWORK MULTICAST SWITCHING APPARATUS AND METHODS".

The subject application is related to the following copending patent applications: U.S. application Ser. No. 08/623,142, filed Mar. 28, 1996, entitled "Interswitch Link Mechanism for Connecting High Performance Network Switches", U.S. application Ser. No. 08/882,632, filed Jun. 25, 1997, entitled "System for Efficient Multicast Distribution in a Virtual Local Area Network Environment"; U.S. application Ser. No. 08/951,820, filed Oct. 14, 1997, entitled "Method and Apparatus for Implementing Forwarding Decision Shortcuts at a Network Switch"; and U.S. application Ser. No. 09/038,504, filed Mar. 11, 1998, entitled "Derived VLAN Mapping Technique". Each of the aforesaid copending applications is assigned to the Assignee of the subject application, and is incorporated into the subject application, by reference, in their entireties.

BACKGROUND OF THE INVENTION

1. Field of the Invention

The present invention relates generally to the distribution of multicast messages in a computer network and, more specifically, to efficient network multicast switching apparatus and methods.

2. Brief Description of Related Prior Art

Data communication in a computer network involves data exchange between two or more entities interconnected by communication links and subnetworks. These entities are typically software programs executing on hardware computer platforms, such as endstations and intermediate stations. Examples of an intermediate station may be a router or switch which interconnects the communication links and subnetworks to enable transmission of data between the endstations. A local area network (LAN) is an example of a subnetwork that provides relatively short distance communication among the interconnected stations, whereas a wide area network enables long distance communication over links provided by public or private telecommunications facilities.

Communication software executing on the endstations correlate and manage data communication with other endstations. The stations typically communicate by exchanging discrete packets or frames of data according to predefined protocols. In this context, a protocol consists of a set of rules defining how the stations interact with each other. In addition, network routing software executing on the routers allow expansion of communication to other endstations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. An example of such a communications architecture is the Internet communications architecture.

The Internet architecture is represented by five layers which are termed, in ascending interfacing order, physical interface, data link, network, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the interface layers 120 and 160. For ease of description, the protocol stack 125 will be described.

In general, the lower layers of the communications stack provide internetworking services and the upper layers, which are the users of these services, collectively provide common network application services. The application layers 12 provides services suitable for the different types of applications using the network, while the lower interface layer 120 accepts industry standards defining a flexible network architecture oriented to the implementation of LANs.

Specifically, the interface layer 120 comprises the physical interface layer 126, which is concerned with the actual transmission of signals across the communication channel and defines the types of cabling, plugs and connectors used in connection with the channel. The data link layer (i.e., "layer 2") 121 is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The primary network layer protocol of the Internet architecture is the Internet protocol (IP) contained within the network layer 116 (i.e., "layer 3"). IP is a network protocol that provides network routing and that relies on transport protocols for end-to-end reliability. An example of such a transport protocol is the Transmission Control Protocol (TCP) contained within the transport layer 114. The term TCP/IP is commonly used to refer to the Internet architecture. (See, e.g., Tanenbaum, *Computer Networks, Third Ed.*, Prentice Hall PTR, Upper Saddle, River, N.J., 1996).

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the network layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the-frame propagates up the layers of the stack 175 until it arrives at the receiving process.

A router is an intelligent intermediate station that implements network services such as route processing, path determination and path switching functions. The router also provides interfaces for a wide range of communication links and subnetworks. The route processing function allows a router to determine the type of routing needed for a packet, whereas the path switching function allows a router to accept a packet on one interface and forward it on a second interface. The path determination, or forwarding decision, function enables the router to select the most appropriate interface for forwarding a packet.

A switch provides the basic functions of a bridge including filtering of data traffic by MAC address, "learning" of a MAC address based upon a source MAC address of a frame and forwarding of the frame based upon a destination MAC address.

In many cases, the destination of a data message issued by a source ("sender") may be more than one, but less than all of the entities ("receivers") on a network; this type of multicast data transfer is typically employed to segregate communication between groups of receivers on the network. IP multicasting, in particular, may be used to disseminate data to a large group of receivers on the network. To effect IP multicasting, a sending process generally specifies a destination IP address that is a multicast address for the message. Receiving processes typically notify their internetwork layers that they want to receive messages destined for the multicast address; this is called "joining a multicast group". These receiving members then "listen" on the multicast address and, when a multicast message is received at a receiver, it delivers a copy of the message to each process that belongs to the group.

Also, Ross (U.S. Pat. No. 5,394,402) discloses an arrangement that is capable of associating any port of a switch with any particular segregated network group. According to Ross, any number of physical ports of a particular switch may be associated with any number of groups within the switch by using a virtual local area network (VLAN) arrangement that virtually associates the port with a particular VLAN designation. Specifically, Ross discloses a switch or hub for a segmented virtual local area network with shared media access that associates VLAN designations with at least one internal port and further associates those VLAN designations with messages transmitted from any of the ports to which the VLAN designation has been assigned. The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated.

In many cases, it may be desirable to interconnect a plurality of these switches in order to extend the VLAN associations of ports in the network. Ross, in fact, states that an objective of his VLAN arrangement is to allow all ports and entities of the network having the same VLAN designation to interchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment.

One type of IP protocol that may be used in a VLAN arrangement to accomplish multicast group registration is the Internet Group Management Protocol (IGMP) which defines operations that may be used by entities to subscribe to or "join" a group. To limit the amount of IGMP traffic, typically only one entity per LAN transmits such a request. Other interested entities will rely on the first subscription request to cause the message to be delivered to the LAN, thereby making it available to all interested entities. The switches may perform additional filtering such that each of the multicast routers receives only one subscription request per group per VLAN. In response, the multicast routers create subscription lists (not shown) associating each group multicast address with the list of VLANs on which at least one subscribing entity resides. Thereafter, the sending entity may utilize this group destination address to send multicast messages to the subscribing entities. Switches in the network may also monitor the IGMP messaging between entities and multicast routers to learn which of their ports lead either to segments comprising a router or at least one entity subscribing to a particular group multicast address.

Thus, although as noted above, switches exist that are able to reduce the number of multicast control messages being forwarded to the multicast routers, the filtering techniques implemented by such switches have been unable to reduce sufficiently the volume of such messages reaching the multicast routers. Further, an undesirably large amount of multicast forwarding decisions are made in conventional networks by the routers, rather than by the switch. Disadvantageously, this can increase the multicast processing burden placed upon the multicast routers, and can increase network message congestion.

Also, some multicast protocols are proprietary to specific vendors and manufacturers of network entities (e.g., Cisco Group Management Protocol, "CGMP"). Interoperability problems can arise when network entities which utilize different proprietary multicast protocols are combined to form a single network.

Additionally, it would be desirable to provide a switched network environment wherein multicast messages are efficiently prevented from being propagated to switched LAN segments wherein no receiving entities (i.e., subscribers) of such messages exist.

SUMMARY OF THE INVENTION

The present invention provides network multicast switching apparatus and methods that when used in a switched network environment are able to ameliorate or eliminate the aforesaid disadvantages and drawbacks of the prior art. More specifically, in one aspect of the present invention, a network switch is provided which detects, and processes differently, specific types of multicast (e.g., IGMP) control messages and multicast data messages, respectively, received by the switch.

In this aspect of the present invention, the switch may include a central forwarding engine (CFE) which examines the IP header portion of the message packet to determine whether the message is one of a specific protocol type of multicast messages (e.g., IGMP). If the CFE determines that the message is of that protocol type, the CFE compares the message's MAC group destination address to a plurality of predetermined MAC destination addresses indicative of types of control message packets that are not of a specific class of control messages for which special processing in accordance with the present invention is desired.

If the MAC group destination address of the packet matches one of the predetermined MAC addresses, or if the packet is not of the special protocol type, the CFE forwards the packet through the switch using conventional bridge forwarding techniques based upon the MAC destination address contained in the MAC header of the message packet. Conversely, if the packet is of the special protocol type and its MAC group destination address does not match one of the predetermined MAC addresses, the CFE forwards the message packet to the switch's network management processor (NMP), which executes these forwarding determinations in accordance with the other aspects of the present invention.

The CFE includes a packet parsing engine (PPE) which examines the information in the IP and MAC header portions of the message packet, and transmits this information to a multicast control packet determination engine (MPDE) and to a bridge forwarding is engine (BFE).

The MPDE determines whether the IP header portion indicates that the packet is of the special protocol type, and if so, determines whether the MAC group destination address in the MAC header portion matches one of the predetermined MAC addresses. If the packet's MAC group destination address does not match one of these predetermined MAC addresses, the MPDE supplies forwarding control signals to a resolution engine (RE) that indicate that the packet is a multicast control message whose forwarding from the switch is to be determined by the NMP. Alternatively, if the MPDE determines that the packet is not one of the special protocol type or that the packet's MAC group destination address matches one of the predetermined MAC addresses, the MPDE supplies forwarding control signals to the RE that indicate that the forwarding of the packet from the switch is to be executed based upon the forwarding control signals supplied to the RE from the BFE.

Using conventional bridge forwarding techniques well known to those skilled in the art, the BFE utilizes the MAC destination address contained in the MAC header portion of the packet essentially as an index into the switch's bridge forwarding table to obtain a forwarding index value (if a forwarding table "hit" occurs for that MAC destination address) indicative of the port(s) via which the packet should be forwarded from the switch in order to reach the stations corresponding to that MAC destination address. Alternatively, if a forwarding table "miss" occurs for that MAC destination address, the BFE may be configured to generate a forwarding index for causing the packet to be flooded to all ports.

The RE determines from the control signals supplied to it from the MPDE whether forwarding of the packet is to be determined based upon the index from the forwarding table or by the BFE. The RE generates a result index which is used to carry out this forwarding decision.

The resultant index may be used by the NMP and switch ports to determine how they will further process the packet received by the switch. For example, the NMP may use the resultant index to determine whether it will further process the packet according to various processing techniques of the other aspects of the present invention (which techniques are described more fully below), or to simply ignore the packet. Likewise, the switch ports may individually use the resultant index to determine whether they will permit the packet to be propagated to the respective network segments coupled to them, or ignore the packet, and thereby effectively prevent the packet's transmission to those respective segments.

In another aspect of the present invention, a switched network multicasting method also is provided which utilizes the above-described network switch of the first aspect of the present invention. In the method, a network switch receives a first multicast control message for removing an endstation from a multicast group specified the message (e.g., an IGMP "leave" message). In response to receipt of this message, the NMP generates a second multicast control message (e.g., a special IGMP query message) and causes the second message to be supplied to the segment containing the endstation from which the first message was received; the second message queries the endstations in that segment as to whether any of the endstations wish to remain subscribed to the multicast group specified in the first message. If the NMP fails to receive, within a predetermined time out period, a third multicast control message (e.g., an IGMP membership report message) from the segment that at least one endstation in the segment wishes to remain subscribed to the multicast group specified in the first and second messages, and the segment is not associated with a router, then the NMP changes the switch's bridging table so as to no longer designate the segment from which it received the first message for receipt of multicast messages from that multicast group. In effect, this prevents transmission to the segment of multicast messages associated with the multicast group. However, if such a third message is received by the NMP, the NMP does not so change the forwarding table, and thus, the multicast messages of the given multicast group continue to be propagated by the switch to the segment. The NMP may determine whether any non-router segments of the switch (i.e., segments that the switch has determined to contain routers) remain to which messages of the multicast group are permitted to be propagated, and if such segments no longer exist, the NMP may cause a single "proxy" leave message to be forwarded to all router-associated segments coupled to the switch.

In another aspect of the present invention, the switch may receive a first message to subscribe a respective endstation to a multicast group (e.g., an IGMP membership report message). In response to receipt of such a request, the NMP may update the switch's forwarding table (if necessary) to reflect the change in subscription status indicated by the message, and forward via at least one port of the switch that has been previously associated by the switch with a router (i.e., a router may be accessed by the segment coupled to that port), a single proxy subscription request specifying the multicast group. The NMP may then not forward, during a predetermined time period after receipt of the first request, additional subscription requests for the same group received by the switch.

In yet another aspect of the present invention, the switch may be initialized to process multicast messages in accordance with a first mode of operation associated with a first multicast protocol (e.g., IGMP). The first mode of operation may be adapted to allow the switch to appropriately process multicast messages only of the first protocol. Thereafter, if the switch receives a multicast message that is in accordance with a second multicast protocol (e.g., CGMP) that is different from the first protocol, the switch may begin processing other multicast messages received by the switch in accordance with a second mode of operation that is different from the first mode of operation. The second mode of operation may be adapted to allow the switch to appropriately process messages of both the first and second multicast protocols. If, after entering the second mode of operation, a predetermined time out period elapses without receipt by the switch of any other messages in accordance with the second protocol, the switch may resume processing in the first mode of operation.

In this aspect of the present invention, if the switch is in the first mode of operation and receives a request to subscribe a respective endstation to a multicast group, the switch may forward this request to the router-associated segments to which it is coupled. The switch may then not so forward, until a predetermined time period has elapsed, additional subscription requests for the same group. Alternatively, if the switch is in the second mode of operation, the switch may transmit each of the subscription requests that it receives to each of the router-associated segments to which it is coupled.

Advantageously, the present invention provides network multicast switch apparatus and methods that are able to ameliorate or eliminate the aforesaid disadvantages and drawbacks of the prior art. More specifically, the network multicast switching apparatus and methods of the present invention are able to reduce the volume of multicast messages being forwarded to and processed by the multicast routers, and are able to shift at least some of such multicast message processing from the multicast routers to the switch. Additionally, by limiting flow of multicast data messages, the present invention is able to decrease network congestion. Also advantageously, the multicast switching apparatus and methods according to the present invention may be used with non-proprietary multicast protocols (e.g., IGMP), are able to efficiently prevent propagation of multicast messages to switch segments wherein no receiving entities exist for such messages, and permit greater networking inoperability among network entities which utilize different multicast protocols.

These and other advantages of the present invention will become apparent as the following Detailed Description proceeds and upon reference to the Drawings, wherein like numerals depict like parts, and in which:

Although the following Detailed Description will proceed with reference being made to illustrative embodiments and methods of use, it should be understood that the present invention is not intended to be limited to these embodiments and methods of use. Rather, the present invention should be viewed broadly as being of broad scope limited only as set forth in the hereinafter appended claims.

DETAILED DESCRIPTION OF AN ILLUSTRATIVE EMBODIMENT

Figure 1:
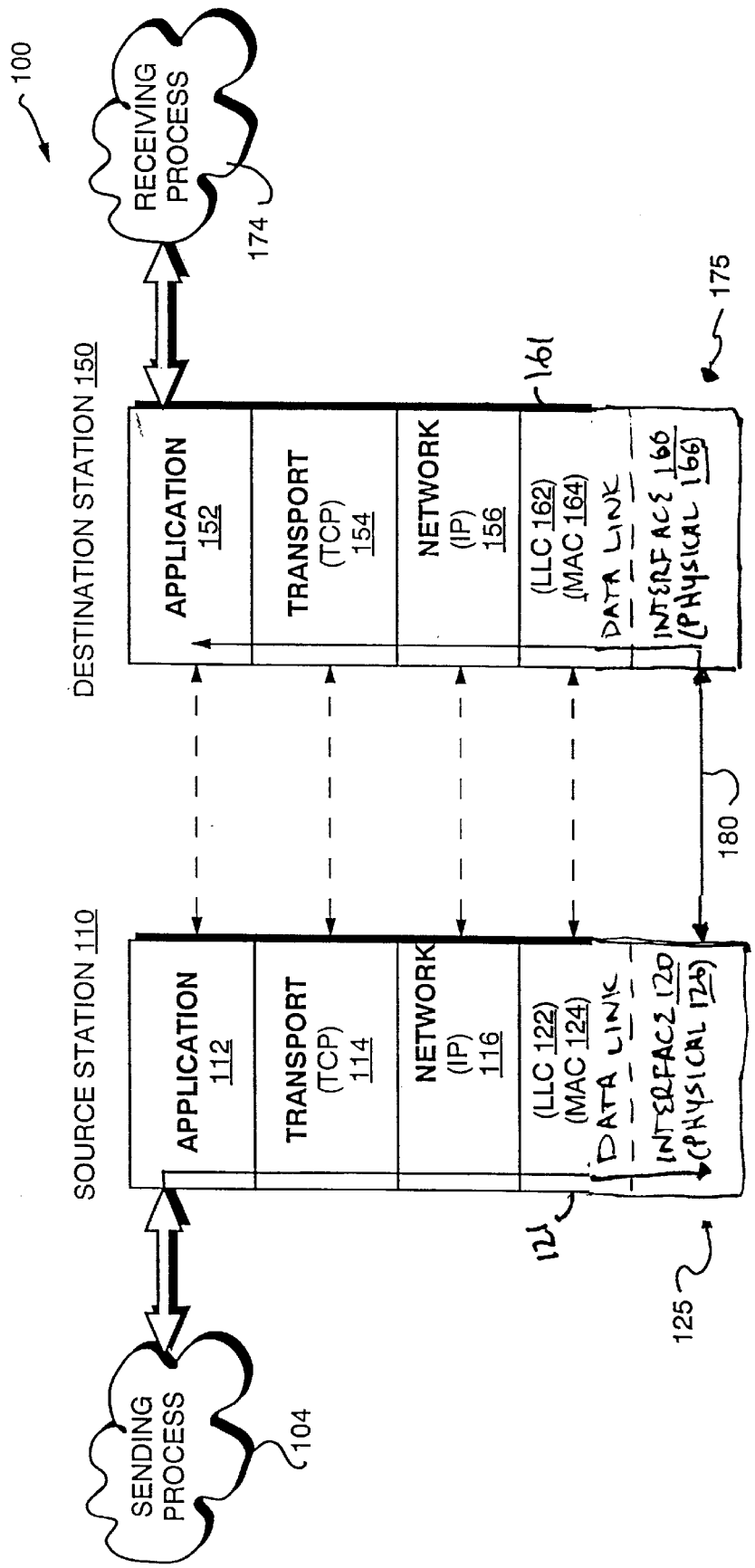
FIG. 1 is a highly schematic block diagram of prior art communications architecture protocol stacks used to transmit data between stations of a computer network.
Figure 2:
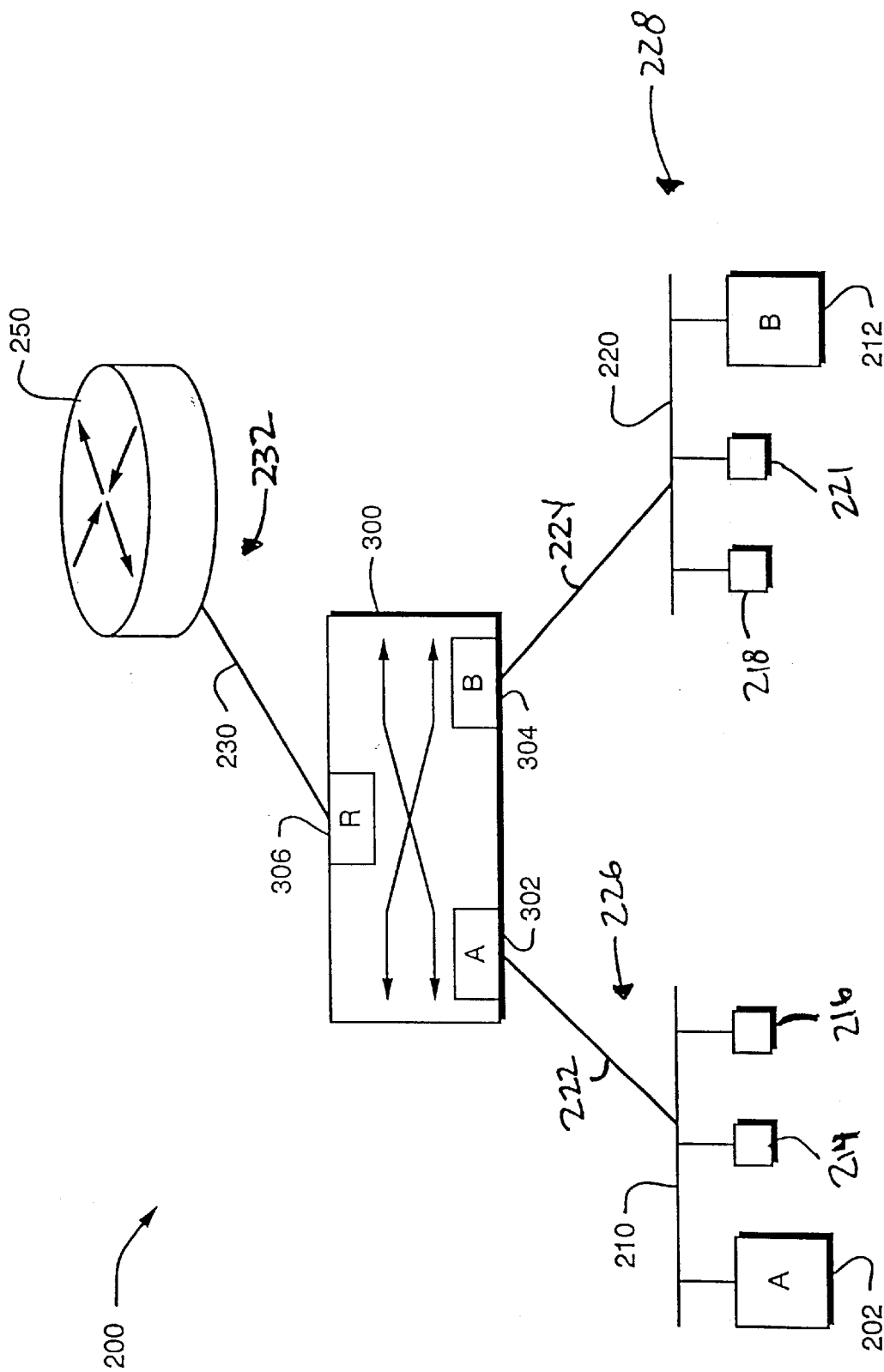
FIG. 2 is a highly schematic block diagram of a computer network comprising a collection of interconnected communication links and subnetworks attached to a plurality of stations, wherein a network switch made in accordance with an illustrative embodiment of the present invention may be used.

FIG. 2 is a block diagram of a computer network 200 comprising a collection of interconnected communication links and subnetworks attached to a plurality of stations. The stations comprise endstations 202, 212, 214, 216, 218, and intermediate stations 250, 300. Specifically, the intermediate station 250 is a multicast router and the intermediate station 300 is a network switch, whereas the endstations 202, 212, 214, 216, 218 may include personal computers or workstations. Switch 300 is made according to one illustrative embodiment of the present invention.

Each of the stations 202, 212, 214, 216, 218, 250, 300 typically comprises a plurality of interconnected elements, such as one or more processors, memories (e.g., random and read only memories, and mass storage devices), and network adapters. The memory may comprise storage locations addressable by the processor and adapter for storing software programs and data structures. The processor may comprise processing elements or logic for executing the software programs and manipulating the data structures. An operating system, portions of which are typically resident in memory and executed by the processor, functionally organizes the stations by, inter alia, invoking network operations in support of software processes executing on the station. It will be apparent to those skilled in the art that other processor and memory means, including various computer readable media, may be used for storing and executing program instructions pertaining to the techniques described herein. Specific features and components of the switch 300 are described in detail below.

The subnetworks included within network 200 preferably comprise local area networks (LANs) 210 and 220. LAN 210 couples together host endstations 202, 214, and 216. Likewise, LAN 220 couples together host endstations 212, 218, 221. In the illustrative embodiment, the switch 300 is a 3-port bridge comprising port A 302, port B 304, and port R 306. LAN 210 is coupled to port A 302 via link 222, LAN 220 is coupled to port B 304 via link 224, and router 250 is coupled to port R via trunk line 230. As used herein, the link 222 and LAN 210 will together be referred to as LAN segment 226, the link 224 and LAN 220 will together be referred to as LAN segment 228, and the link 230 and router 250 will together be referred to as router segment 232. Communications among the stations 202, 212, 214, 216, 218, 221, 250, and 300 of the network are typically effected by exchanging discrete data frames or packets between the communicating nodes according to a predefined protocol.

Figure 5:
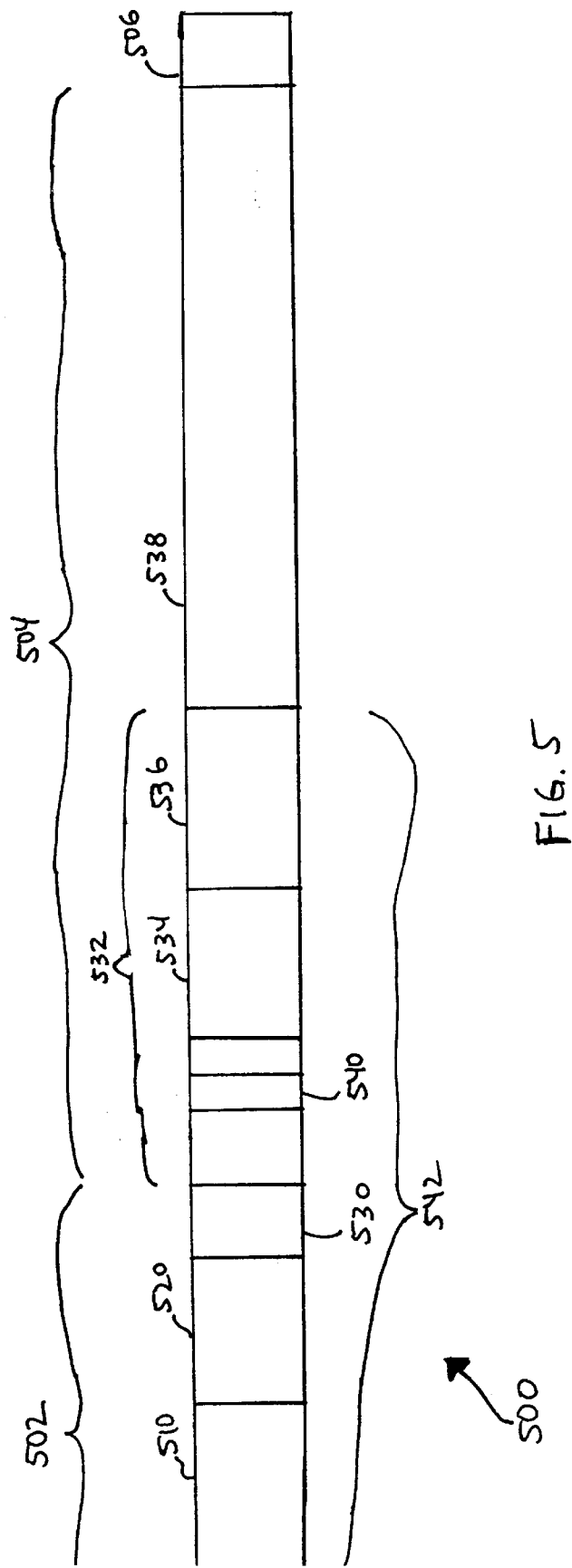
FIG. 5 is a schematic diagram illustrating the construction of a typical message packet transmitted or received by the switch of FIG. 3.
Figure 1:
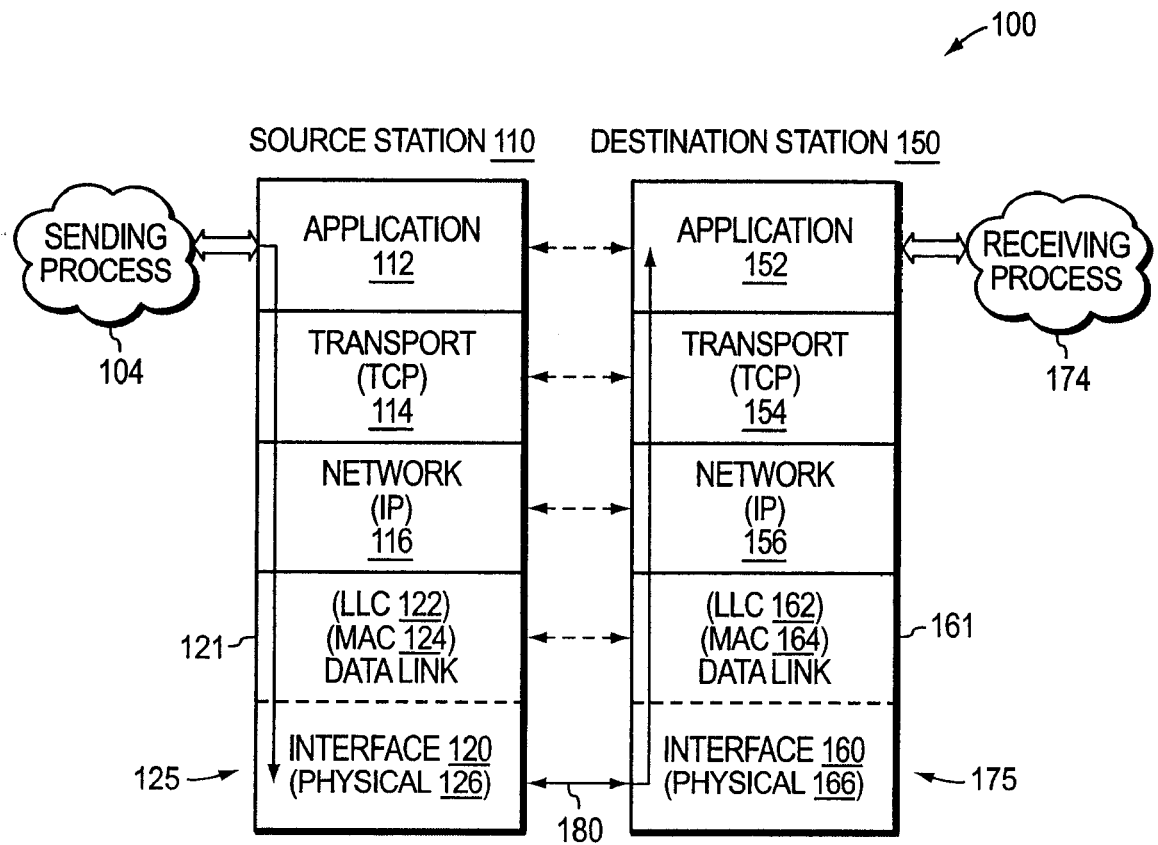
Figure 2:
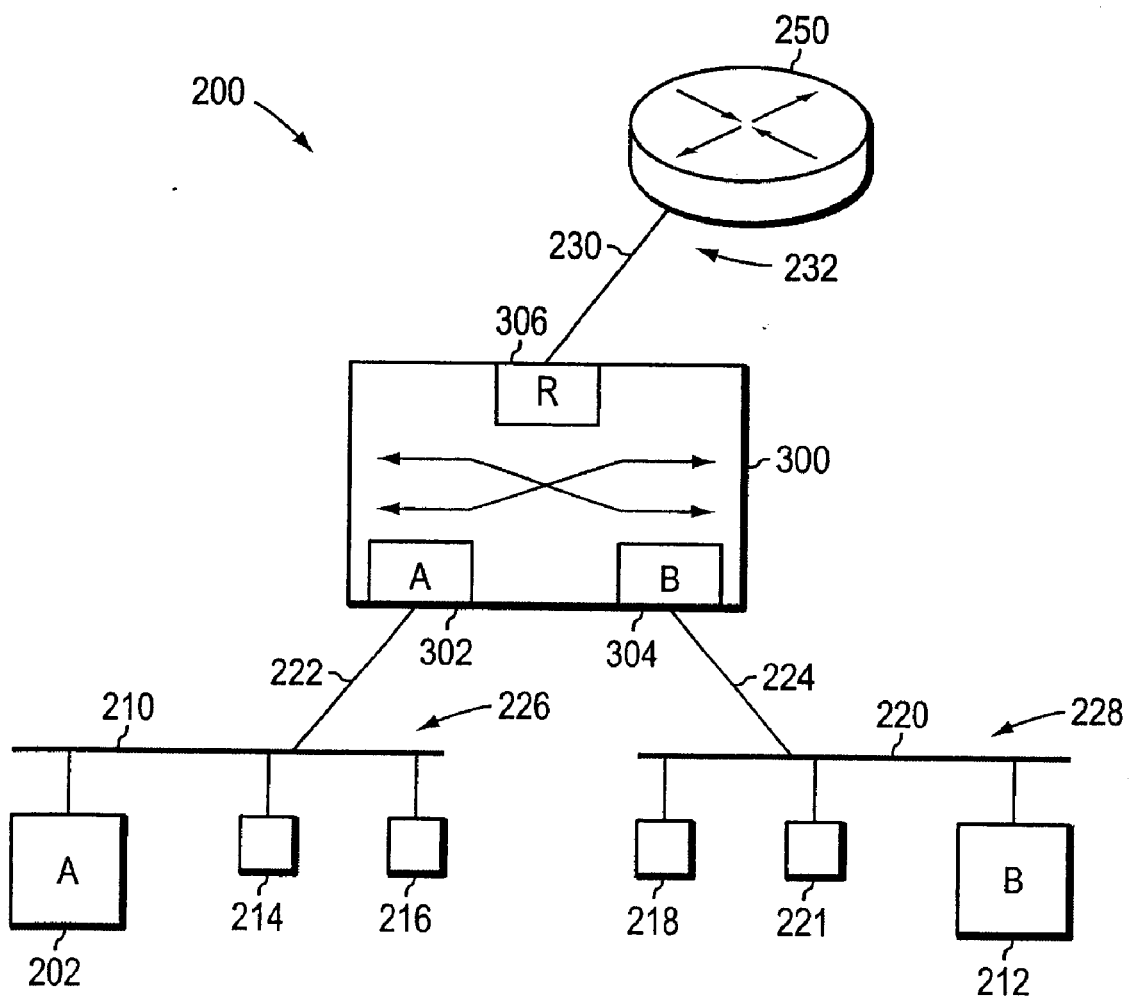
Figure 3:
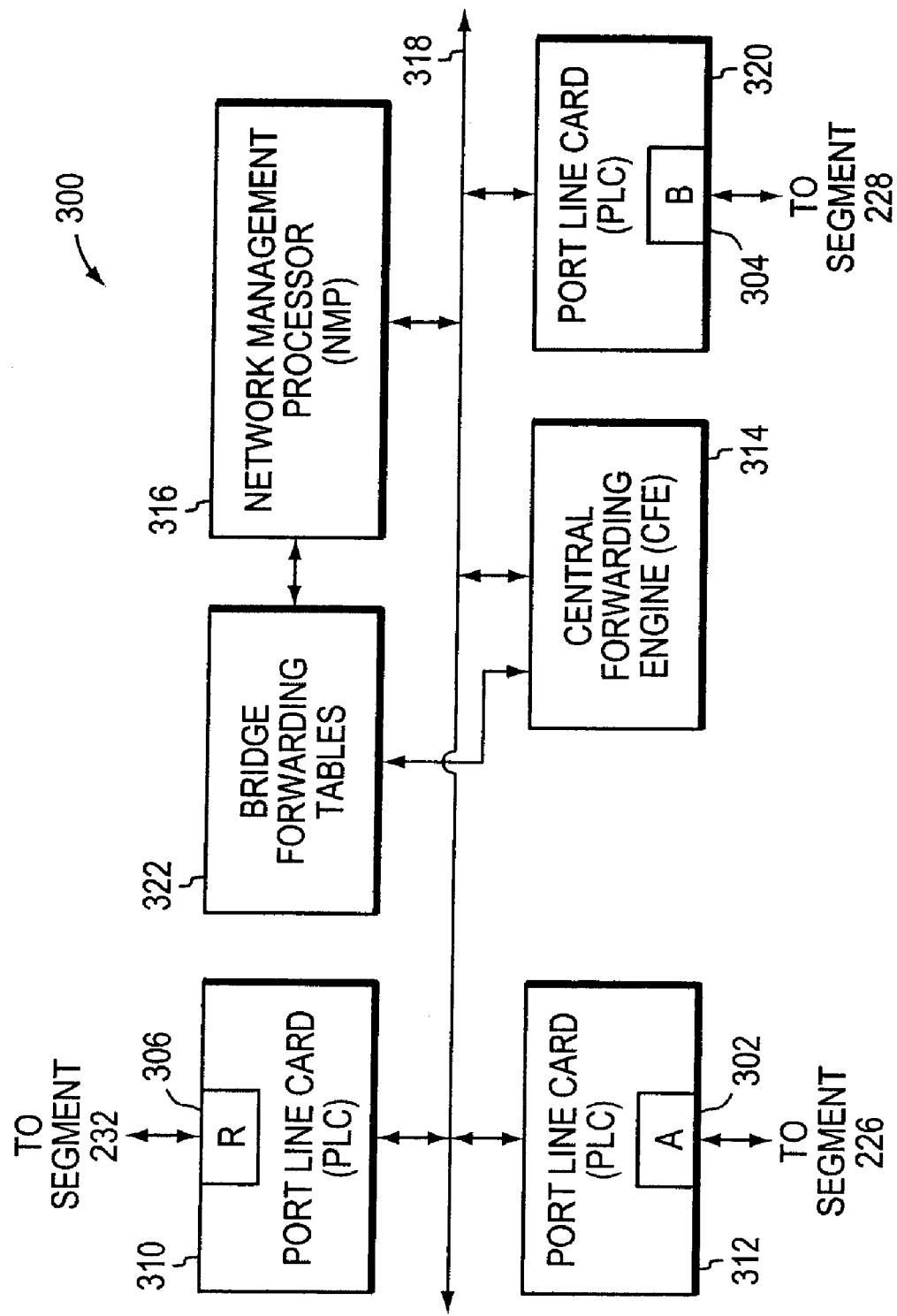
Figure 4:
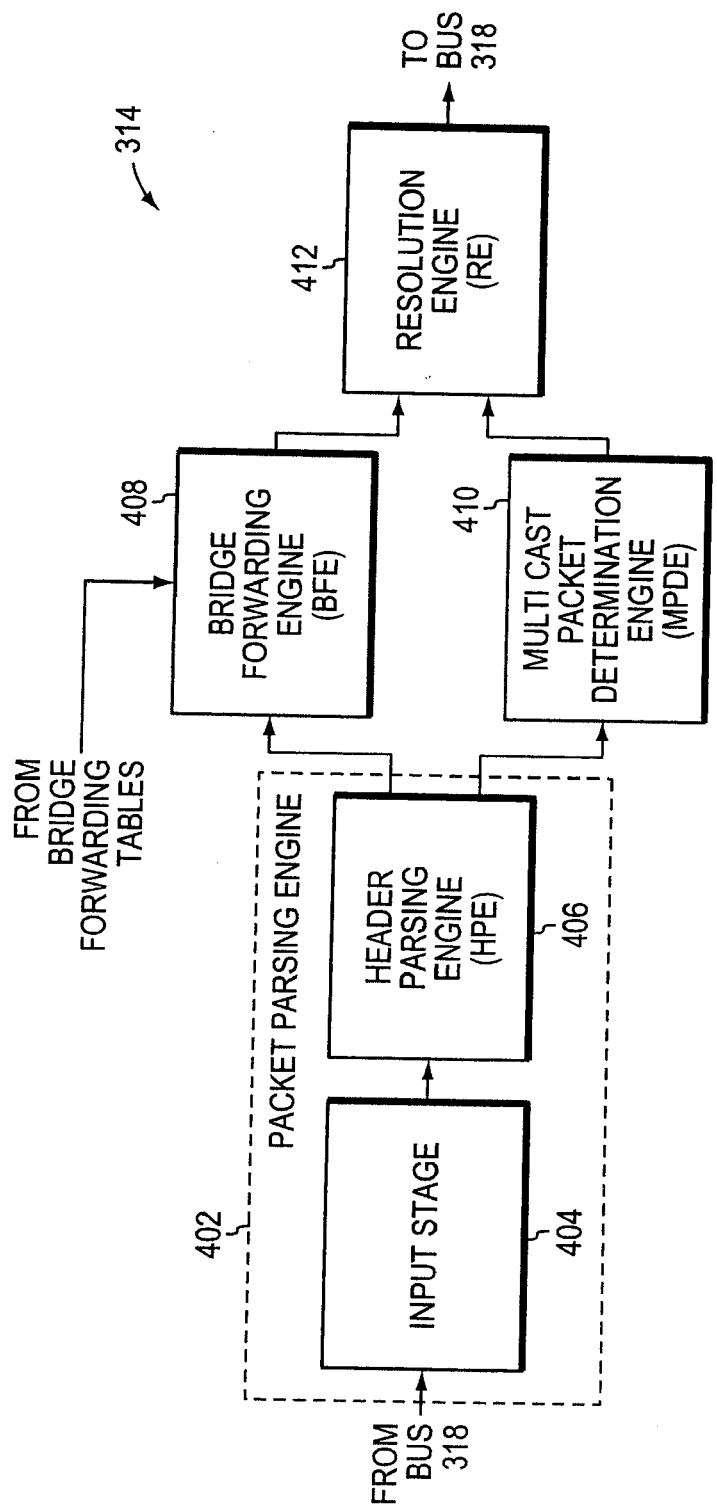
Figure 5:
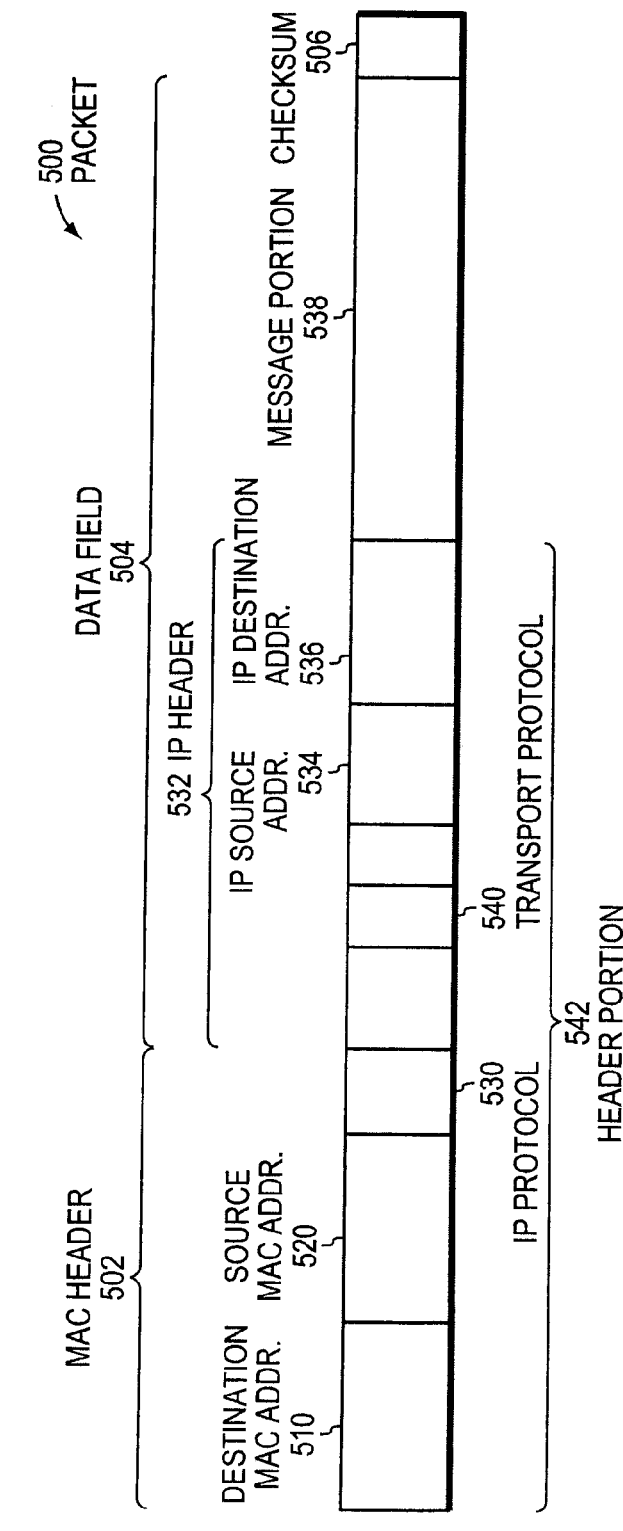

In arrangement 200, all message packets sent or received from the switch 300 are Ethernet frames that include at least the fields shown in FIG. 5. As shown in FIG. 5, a typical Ethernet message packet 500 transmitted or received by the switch 300 includes at least MAC header 502, data field 504, and checksum field 506. Header 502 includes destination and source MAC address fields 510, 520, respectively, and a protocol type field 530 that identifies the protocol (e.g., IP, IPX, AppleTalk, DECNet) of the data carried by the frame. Field 504 contains IP header 532 and message portion 538. Header 532 contains IP source address 534, IP destination address 536, and protocol type field 540 that contains a number representing the transport layer protocol being carried by IP field 504.

Since stations A and B are on different subnetworks, they communicate by way of router 250. For example, station A forwards a frame through switch 300 to router 250 and the router performs a forwarding decision to route the frame through the switch to Station B.

Figure 3:
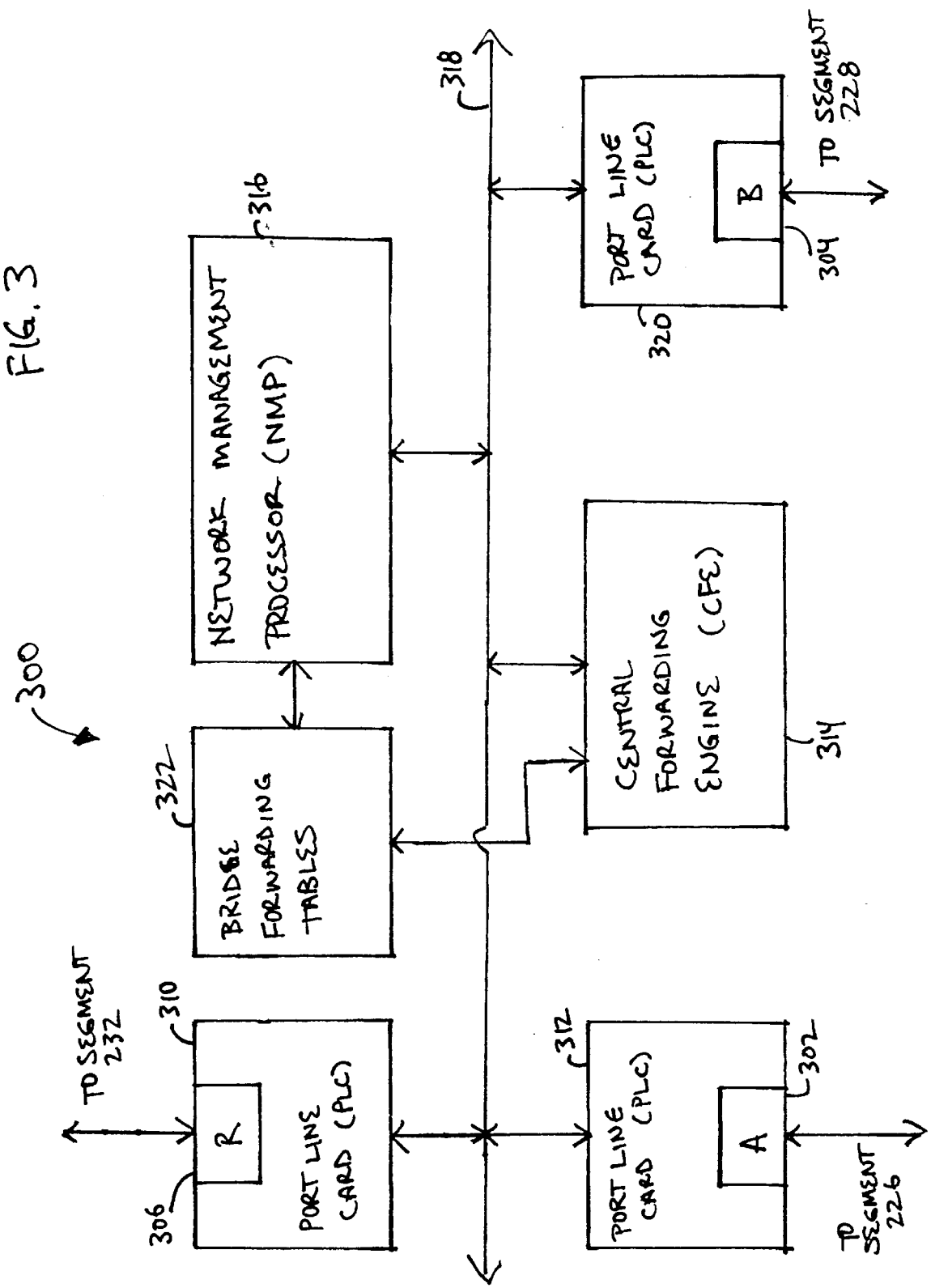
FIG. 3 is a highly schematic block diagram of a network switch made in accordance with an illustrative embodiment of the present invention.

FIG. 3 is a high level, functional schematic diagram of switch 300, which is made according to one embodiment of the present invention. Switch 300 includes a main bus 318 to which are coupled to port line cards (PLCs) 310, 312, 320 which provide switch ports R, A, and B (306, 302, 304), respectively. Central forwarding engine (CFE) 314, and bridge forwarding table and associated logic 322 are each coupled to network management processor (NMP) 316. NMP 316 is coupled to bus 318.

When a message packet 500 is received by any of the ports A, B, or R of the switch 300, the corresponding line card 312, 320, or 310, respectively, transmits the packet to bus 318. The packet is broadcast via bus 318 so as to make the information contained in the packet available to each of the line cards, CFE 314, and NMP 316.

Figure 4:
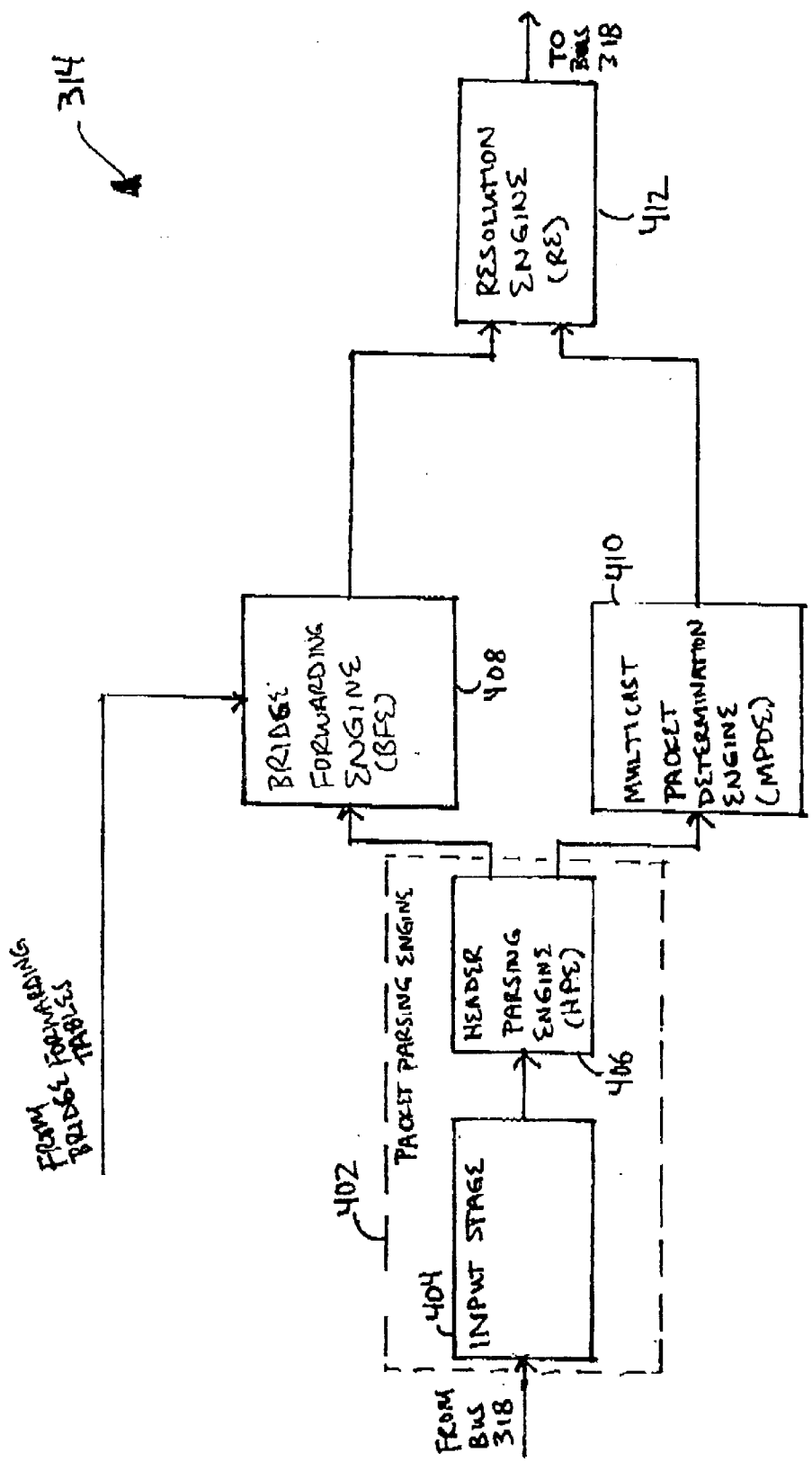
FIG. 4 is highly schematic block diagram of the CFE of FIG. 3.

As shown in FIG. 4, CFE 314 includes a packet parsing engine (PPE) comprising message packet input stage 404 and header parsing engine (HPE) 406. Input stage 404 examines the packet broadcast via bus 318 so as to determine the information in the overall header portion 542 (i.e., both MAC and IP header portions 502, 532) of the packet. The information in header portion 542 is then examined by header parsing engine (HPE) 406, which parses the information header portion into the respective information of MAC header portion 502 and the IP header portion 532.

BFE 408 is configured to examine the MAC header 502 information provided to it by the HPE 406 so as to obtain the MAC destination address 510 contained therein, and to use the MAC destination address 510, in a conventional manner, essentially as an index into the information contained in the switch's bridge forwarding tables 322. Tables 322 associate the MAC addresses of the entities 202, 212, 214, 216, 218, 221, and 250 with the respective ports A, B, R via which the switch 300 may transmit messages to the respective segments 224, 226, 232 containing these entities. The ports A, B, R are further associated with forwarding index values which identify the port or ports. Similarly, tables 322 contain a forwarding index value which identifies the NMP 316. Based upon the MAC destination address 510, the BFE 408 obtains the index value(s) of the port(s) coupled to the respective segments comprising the network entities addressed by the MAC destination address 510. This index value is transmitted by the BFE 408 to the resolution engine (RE) 412. Alternatively, if the BFE 408 is unable to obtain from the tables 322 a forwarding index value (e.g., if no switch port is yet associated in the tables 322 with the particular destination address 510), then the index value supplied to the RE 412 may identify all ports A, B, R, but not the NMP.316.

Engine 410 is configured to determine from the IP header 532 the IP protocol type 540 and IP destination address 536 information contained therein. In this embodiment, engine 410 then determines from the IP protocol information 540 whether the message packet 500 is an IGMP message (i.e., having an IP protocol type equal to 0x2). If the packet 500 is determined by the engine 410 to be an IGMP message, the engine 410 then essentially compares the MAC destination address contained in the packet to predetermined MAC group addresses that may indicate types of IGMP messages that are not of a specific class of IGMP control messages (e.g., the class consisting of IGMP "leave," "membership report," and "group specific query," etc. messages as discussed herein). In this embodiment, the predetermined MAC group addresses comprise those MAC addresses in the range between 01-00-5E-00-00-01 and 01-00-5E-00-00-FF, excluding 01-00-5E-00-00-02. As will be appreciated by those skilled in the art, the latter MAC group address of 01-00-5E-00-00-02 corresponds to an IGMP group destination address of "all-routers." Also, the MAC address range between 01-00-5E-00-00-01 and 01-00-5E-00-00-FF contains addresses that indicate e.g., IGMP general queries (MAC group address 01-00-5E-00-00-01), and which correspond to IP multicast addresses of 224.0.0.X that are reserved for local network traffic (e.g., a single network layer hop).

The engine 410 generates and supplies signals to the RE 412 that control operation of the RE 412, depending upon whether the engine 410 determines that the packet 500 is an IGMP packet, and whether the engine 410 determines that the MAC destination address in the packet matches one of the predetermined MAC group addresses. More specifically, the signals supplied to the RE 412 include indications as to whether the packet 500 is an IGMP packet, and if so, whether the MAC destination address in the packet matches one of the aforesaid predetermined MAC addresses. If the control signals from the engine 410 indicate that the packet 500 is an IGMP message, and the MAC destination address does not match one of the predetermined MAC group addresses, then the RE 412 in response to the control signals, ignores the forwarding index provided to the RE 412 by the BFE 408 and supplies a forwarding command to the PLCs 310, 312, 320 and the NMP 316 that contains a forwarding index that indicates that the packet 500 is to be processed by NMP 316 and an identification of the packet 500 for which the forwarding command is intended. This causes the PLCs 310, 312, 320 to ignore the frame 500, and causes the NMP 316 to determine how the frame 500 is to be forwarded by the switch 300.

Alternatively, if the control signals supplied to the RE 412 by the engine 410 indicate that the packet 500 is an IGMP message, but that the MAC group address in the packet matches one of the predetermined MAC addresses, then in response to these control signals, the RE 412 supplies to the PLCs 310, 312, 320 and NMP 316 a forwarding command that contains the forwarding index provided to the RE 412 by the BFE 408 and an identification of the packet 500 for which the forwarding command is intended. This causes those PLCs 310, 312, 320 having respective ports that correspond to this forwarding index to forward the packet 500 to the respective segments to which the corresponding ports are coupled. Alternatively, segments that are not coupled to such corresponding ports do not receive the packet 500 from the switch 300. Likewise, in response to receipt of the forwarding index from the RE 412, the NMP 316 ignores the packet 500.

If the control signals supplied to the RE 412 by the engine 410 indicate that the packet 500 is not an IGMP message, then regardless of whether those control signals indicate that the MAC destination address matches or does not match one of the predetermined MAC addresses, the RE 412 supplies in response to those control signals a forwarding command to the PLCs 310, 312, 320 and NMP 316 that contains the forwarding index provided to the RE 412 by the BFE 408 and an identification of the packet 500 for which the forwarding command is intended.

If the forwarding command supplied to the NMP 316 by the RE 412 indicates that the NMP 316 is to determine how the packet 500 is to be forwarded by the switch 300, the NMP 316 examines the packet 500 to determine the type of IGMP message that it is (i.e., "membership report," "leave," etc.), and then determines the message's forwarding and/or other processing based thereon. For example, if one of the endstations (e.g., station A 202) comprised in segment 226 wishes to end its subscription to a specific multicast group, in accordance with this embodiment of the present invention, it forwards to port A 302 via LAN 210 an IGMP "leave" message which designates in its MAC and IP destination address fields the address of the multicast group to which the station A wishes to be unsubscribed. The switch 300 processes this leave message in the manner described above, and the RE 412 forwards to the NMP 316 a forwarding command that indicates to the NMP 316 that it is to determine how the leave message is to be forwarded by the switch 300.

In response to this forwarding command, the NMP 316 determines from its examination of the leave message packet (and appropriate information in the forwarding tables) that the packet is an IGMP leave message from the endstation A having the MAC and IP source addresses specified in the leave message. The NMP 316 then forwards to the segment 226, via port A, a special IGMP query message in accordance with the present invention. The special IGMP query message consists of an Ethernet frame wherein the IP data portion 504 is appropriate for an IGMP general query message (i.e., the IP group destination address is set to all-systems multicast address 224.0.0.1), but the MAC multicast destination address is set equal to the specific MAC multicast group that was designated in the leave message. This special message propagates through the segment 226, and causes any endstation in that segment 226 that subscribes to that specific MAC multicast group to transmit to the switch 300 an IGMP multicast group membership report message designating the MAC multicast group.

Any such report message received by the switch 300 is processed by the CFE in the manner described above, and since this is one of the special class of IGMP messages for which processing by the NMP 316 is desired, the CFE commands the NMP to process any such report message. In response to a command to process any such report message, the NMP examines the tables 322 to determine whether appropriate entries exist therein for the MAC group destination address specified therein and the port from which the report was received (e.g., correlating the MAC group destination address with the particular switch port from which the report message was received so as to indicate that at least one network entity exists on the segment coupled to that port that subscribes to that multicast group). If such an entry exists in the tables 322 (as would be the case in the above scenario), then the NMP undertakes no further action in regard to processing the "leave" message from endstation A.

Alternatively, if no such entries exist in the tables 322 (as would be the case if the report message(s) received by the switch were unsolicited, i.e., not in response to a membership query message), then the NMP 316 creates such an entry in the tables 322. Such unsolicited IGMP report messages may be used by the endstations in network 200 to subscribe to multicast groups. When such unsolicited report messages are received by the NMP, after the NMP checks and updates (if necessary) the tables 322 in the manner discussed above, the NMP determines if a report message suppression timer (RMST) has been set for report messages designating the particular IP (or alternatively, MAC) group destination address specified in the report message. If no such RMST has been set, then the NMP sets such a timer to determine when a predetermined time period has elapsed (e.g., 10 seconds) and causes the repart message to be forwarded from the switch 300 to all router-associated segments (e.g., segment 232). If, after receipt of the "first" report message designating the particular multicast group destination address (i.e., the message that triggered setting of the RMST for that group destination address) but prior to the elapsing of the predetermined time period, the NMP receives from the port from which the first report was received subsequent report message(s) designating that group destination address, the NMP ignores those subsequent report message(s). Of course, if subsequent report messages are received from other ports and/or designating other multicast destination addresses, the NMP will check the tables 322 to ensure that appropriate entries exist therein for such ports and destination addresses.

Also alternatively, if no report message is received from the segment 226 within a predetermined time period (e.g., 10 seconds) after transmission of the special IGMP query message thereto, the NMP will assume therefrom that no other endstations in segment 226 subscribe to the multicast group associated with the MAC group destination address in the special IGMP query message. The NMP will then "prune" the port connected to this segment by updating the entries in the tables 322 to no longer associate that port with the multicast group associated with the MAC group destination address in the special IGMP query message. After updating the tables 322 in this manner, the NMP examines the remaining entries in the tables 322 to determine whether any non-router-associated ports (e.g., port B which is not coupled to a router-associated segment) remain that are still associated with endstations (e.g., station B) that subscribe to the multicast group associated with that MAC group destination address, and if no such ports remain, the NMP causes an IGMP leave message designating the MAC group destination address and associated IP group destination address to be transmitted via all router-associated ports (e.g., port R) to all router-associated segments (e.g., segment 232).

If an IGMP leave message is received by the switch 300 via a router-associated port, the NMP does not transmit to the segment coupled to that port the special IGMP query message. Rather, the NMP waits for an appropriate time period to see if an IGMP membership report message is received by the same router-associated port. If no such membership report message is received, the NMP updates the tables 322 to modify the index associated with the group destination address of the leave message such that the router-associated port from which the leave message was received is no longer associated with that group destination address.

Another feature of switch 300 is that switch 300 uses router control packets (e.g., IGMP general query messages) received by the switch 300 to "learn" which ports are coupled to segments that comprise routers. More specifically, when switch 300 receives an IGMP general query message, since its MAC group destination address generated by the concatenation performed by the engine 410 is one of the predetermined MAC addresses, the IGMP general query message is forwarded by the switch 300 based upon the information contained in the tables 322. This information causes the general query message to be flooded to all of the segments coupled to the switch 300 and also causes the NMP to update the tables 322 so to associate the port via which the general query was received with a multicast router (i.e., the tables 322 are updated to associate the segment coupled to that port as being a router-associated segment). Other types of queries/messages may also be used by the switch 300 in this manner to learn the router ports (e.g., Protocol Independent Multicast (PIM) Version 1 Queries having a MAC destination address of 01-00-5E-00-00-02, PIM Version 2 Queries having a MAC destination address of 01-00-5E-00-00-0D, Distance Vector Multicast Routing Protocol messages having a MAC destination address of 01-00-5E-00-00-04, Multicast Extensions of Open Shortest Path First Protocol having a MAC destination address of 01-00-5E-00-00-05 and 01-00-5E-00-00-06).

Another feature of the switch 300 is that it is able to determine whether in network 200 there exists only multicast sources (i.e., that no multicast receiving stations exist in the network 200), and to take appropriate action if such condition is determined to be present in the network 200. More specifically, the CFE may include logic (not shown) for causing a MAC group destination address to be recorded when a "miss" occurs in accessing the destination address in the tables 322 (i.e., if no entries exist in the table 322 which correlate the destination address to a port via which the message containing the destination address should be forwarded to further transmission of the message to the message destination). The NMP may periodically (e.g., every 3 seconds) poll this logic to determine whether repeated misses are associated with a particular destination address, thereby indicating that no receiver for this destination address is present in the network 200. The NMP may cause this destination address to be associated with any router-associated ports of the switch 300 so as to cause any further multicast messages directed to this destination address to be forwarded to the router-associated segments coupled to these ports. Once a host membership report is received for this destination address, the NMP may update the tables 322 to cause further messages directed to that destination address to be forwarded to the segment from which the membership report was received.

Likewise, it should be understood that the BFE may contain conventional logic for "learning" the port and endstation MAC address associations in the network 200, and for recording these associations in the tables 322.

Of course, although the components of switch 300 shown in FIG. 3 may be logically thought of as being connected to a single bus 318, the actual physical components of the switch 300 that carry out the aforedescribed functions specified for the components shown in FIG. 3 may be connected together by multiple separate buses in order to speed data transfers being those physical components so connected. For example, the CFE may be embodied in an application specific integrated circuit (ASIC) and may forward resultant indices to the port line cards via a special bus (not shown) that is separate from the bus or buses used to transfer other types of data in the switch 300.

In an alternate embodiment, the switch 300 may be configured with a virtual local area network (VLAN) arrangement that virtually associates each port of the switch with a particular segregated network group. An example of a such an arrangement that may be used with the present invention is disclosed in the aforesaid Ross patent.

Referring to FIG. 2, port A 302 may be configured to operate on, e.g., a red VLAN, port B 304 may be configured to operate on a blue VLAN, and port R 306 may be configured to operate on both the red and blue VLANs. In an embodiment where each VLAN encompasses an entire subnetwork, the router 250 and Station A 202 are on the red VLAN subnetwork, the router 250 and Station B 212 are on the blue VLAN subnetwork, and the router 250 routes packets between the red and blue VLANs. Within the red and blue VLAN subnetworks there may be other switches with many ports performing low-level bridging operations among themselves. The tables 322 may include appropriate information associating the ports of the switch with the various VLAN designations of the network 200, etc.

In this alternative arrangement, the BFE may be modified to generate its indices also based, at least in part, upon whether the message packet was received via a switch port associated with one or more predetermined VLAN subnetwork(s). Similarly, rather than being based upon the VLAN subnetwork from which the particular packet was received, the BFE in this alternative arrangement may also base its generation of the index for that packet upon, at least in part, the Derived VLAN (DVLAN) of origin of the packet. Such DVLAN information may be obtained in accordance with the teachings set forth in cross-referenced, copending application Ser. No. 09/038,504 filed on Mar. 11, 1998, entitled "Derived VLAN Mapping Technique."

Also, instead of generating control signals that cause the forwarding of the packet to be determined by the NMP 316 only if the packet is an IGMP packet, if appropriately modified, the engine 410 may cause the RE 412 to command the NMP 316 to determine forwarding of the packet 500 if the packet 500 is of some other type of IP protocol (e.g., UDP, TCP, etc.). Further, one or more registers (not shown) may be provided in the switch 300 for storing user-preferences as to the IP protocols that the engine 410 is to compare to the IP protocol 540 of the message packet 500 to determine how the packet 500 is to be forwarded. Likewise, the predetermined MAC group addresses used by the engine 410 may be user-selectable by writing appropriate address values to one or more registers (not shown) contained in the switch 300. This variation may be used to advantage in a network system comprising entities (e.g., other switches) that are configured to process multicast control messages of other protocol types (i.e., other than IGMP, such as CGMP).

More specifically, in such a network system, the switch 300 may be configured to be compatible with the network entities that use CGMP control messages. The CFE and NMP of the switch 300 may be configured to initialize themselves (i.e., upon initial powering up of the switch 300) into a first mode of operation wherein it is expected that the only multicast control messages that they will process are IGMP control messages. In this first mode of operation, the switch 300 processes received message frames in the manner described above. Thereafter, if the switch 300 receives a multicast control message that is in accordance with a multicast protocol (e.g., CGMP) that is not IGMP, the switch may begin processing received multicast control messages in accordance with a second mode of operation that is different from the first mode of operation. For example, in order to permit the switch 300 to be compatible with the other network entities that utilize CGMP, rather than suppress forwarding of multiple subscription requests that the switch 300 receives, when the switch 300 is in the second mode of operation, the CFE may cause the NMP control forwarding/processing of all such subscription requests (i.e., both IGMP and CGMP subscription requestion) so as to cause each subscription request that is received by the switch 300 to be forwarded to each of the router-associated segments to which the switch 300 is coupled. Also in this second mode of operation, if after receiving a CGMP control message the switch fails to receive another CGMP message within a predetermined time out period, the switch 300 may return to the first mode of operation.

Also alternatively, the entire MAC destination address need not be compared to the predetermined MAC group addresses by the engine 410. Rather, only a predetermined range of the bits (e.g., the highest order 47 bits) comprising the group destination address need be used in the comparison. Additionally, various of the bits of the group destination address may be masked prior to comparison with the predetermined addresses. Other modifications are also possible.

For example, the NMP may be configured to detect the version of IGMP messages being processed (i.e., version 1 or version 2) and to process messages of different versions differently, so as to permit faster processing of version 2 leave messages. Additionally, switch 300 may be configured to deal with endstations that unsubscribe "silently" (i.e., without generating appropriate messages for indicating same). More specifically, the switch 300 may be configured to prune a port from transmission of multicast data messages of a particular group if the port does not receive a membership report message after transmission via the port of a predetermined number (e.g., three) previous general general query messages for that group.

Also, the NMP may generate a general query message, in response to a received leave message, for transmission from the switch 300 that includes a MAC destination address that is derived from the IP destination address in the received message. More specifically, in order to generate the derived MAC group destination address from the IP group destination address 536, a standard technique may be used to convert the IP group address 536 into a corresponding MAC group address. According to this technique, the highest order 9 bits of the IP group address 536 are first truncated so as to leave a truncated address consisting of the lowest order 23 bits of the IP group address 536. The MAC group address is then generated by concatenating the following, in this order, from highest order to lowest order: a first byte equal to 0x01, a second byte equal to 0x00, a third byte equal to 0x5E, a bit equal to zero, and the truncated address.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

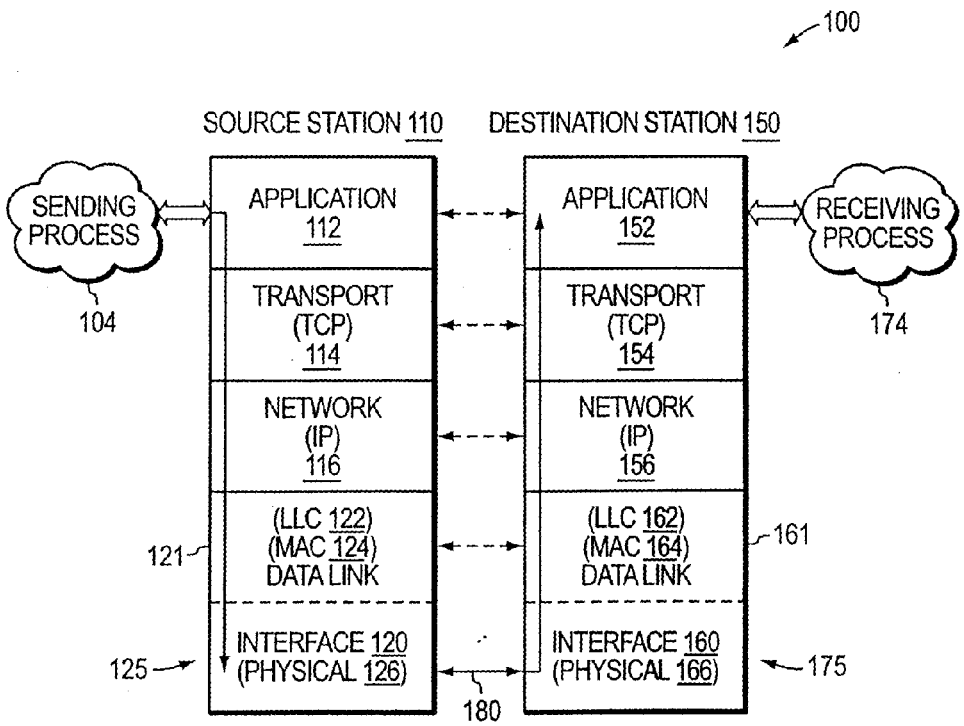

What is claimed is:

1. A network multicasting method for use with at least one switch, said method comprising:

initializing said switch to process multicast messages in accordance with a first mode of operation of said switch associated with a first multicast protocol;

receiving at said switch at least one multicast message that is in accordance with a second multicast protocol different from said first protocol;

in response to receipt at said switch of said at least one multicast message, processing other multicast messages received by said switch in accordance with a second mode of operation of said switch that is different from said first mode of operation; and if after starting to process said other multicast messages according to said second mode of operation a predetermined time period elapses wherein said switch does not receive an additional multicast message that is in accordance with said second protocol, resuming processing of received multicast messages by said switch in accordance with said first mode of operation.

2. A switch, comprising:

means for initializing said switch to process multicast messages in accordance with a first mode of operation of said switch associated with a first multicast protocol, said first mode of operation suppressing transmission of some multicast control messages;

a port to receive at least one multicast message that is in accordance with a second multicast protocol different from said first protocol;

means for processing other multicast messages received by said switch in accordance with a second mode of operation of said switch that is different from said first mode of operation, said second mode of operation not suppressing transmission of multicast control messages; and means for resuming processing of received multicast messages by said switch in accordance with said first mode of operation.

3. The switch according to claim 2, wherein the first mode of operation suppresses transmission of multicast control messages for a predetermined time period, after which time at least one of the suppressed multicast control messages is transmitted.

4. A switch, comprising:

a processor to initialize said switch to process multicast messages in accordance with a first mode of operation of said switch associated with a first multicast protocol, said first mode of operation suppressing transmission of some multicast control messages;

a port to receive at least one multicast message that is in accordance with a second multicast protocol different from said first protocol;

a header parsing engine to initiate processing of other multicast messages received by said switch in accordance with a second mode of operation of said switch that is different from said first mode of operation, said second mode of operation not suppressing transmission of multicast control messages; and means for resuming processing of received multicast messages by said switch in accordance with said first mode of operation.

5. The switch according to claim 4, wherein the first mode of operation suppresses transmission of multicast control messages for a predetermined time period, after which time at least one of the suppressed multicast control messages is transmitted.

6. A switch, comprising:

a processor to initialize said switch to process multicast messages in accordance with a first mode of operation of said switch associated with a first multicast protocol;

a port to receive at least one multicast message that is in accordance with a second multicast protocol different from said first protocol;

a header parsing engine to initiate processing of other multicast messages received by said switch in accordance with a second mode of operation of said switch that is different from said first mode of operation; and a timer to measure a time interval since receipt of a message in said second mode of operation, and responsive to said measured time interval exceeding a time out period, resuming processing of received multicast messages by said switch in accordance with said first mode of operation.

7. A switch, comprising:

a processor to initialize said switch to process multicast messages in accordance with a first mode of operation of said switch associated with a first multicast protocol; and at least one port to receive at least one multicast message that is in accordance with a second multicast protocol different from said first protocol, wherein in response to receipt at said switch of said at least one multicast message, said processor processes other multicast messages received by said switch in accordance with a second mode of operation of said switch that is different from said first mode of operation, and if after starting to process said other multicast messages according to said second mode of operation a predetermined time period elapses wherein said switch does not receive an additional multicast message that is in accordance with said second protocol, said processor resumes processing of received multicast messages in accordance with said first mode of operation.

8. A computer-readable media, comprising:

instructions for execution in a processor for the practice of a method, said method having the steps, initializing said switch to process multicast messages in accordance with a first mode of operation of said switch associated with a first multicast protocol;

receiving at said switch at least one multicast message that is in accordance with a second multicast protocol different from said first protocol;

in response to receipt at said switch of said at least one multicast message, processing other multicast messages received by said switch in accordance with a second mode of operation of said switch that is different from said first mode of operation; and if after starting to process said other multicast messages according to said second mode of operation a predetermined time period elapses wherein said switch does not receive an additional multicast message that is in accordance with said second protocol, resuming processing of received multicast messages by said switch in accordance with said first mode of operation.

9. Electromagnetic signals propagating on a computer network, comprising:

instructions for execution on a processor for the practice of a method, said method having the steps, initializing said switch to process multicast messages in accordance with a first mode of operation of said switch associated with a first multicast protocol;

receiving at said switch at least one multicast message that is in accordance with a second multicast protocol different from said first protocol;

in response to receipt at said switch of said at least one multicast message, processing other multicast messages received by said switch in accordance with a second mode of operation of said switch that is different from said first mode of operation; and if after starting to process said other multicast messages according to said second mode of operation a predetermined time period elapses wherein-said switch does not receive an additional multicast message that is in accordance with said second protocol, resuming processing of received multicast messages by said switch in accordance with said first mode of operation.

10. A computer network, comprising:

at least one first endstation configured to communicate over said network using multicast messages of a first multicast protocol;

at least one second endstation configured to communicate over said network using multicast messages of a second multicast protocol different from said first multicast protocol;

a switch coupled to said first and second endstations, said switch being (i) initialized to process multicast messages in accordance with a first mode of operation associated with said first multicast protocol, (ii) adapted to receive at least one multicast message that is in accordance with said second multicast protocol, (iii) configured to process, in response to receipt at said switch of said at least one multicast message, other received multicast messages in accordance-with a second mode of operation that is different from said first mode of operation, wherein if after starting to process said other multicast messages according to said second mode of operation a predetermined time period elapses wherein said switch does not receive an additional multicast message that is in accordance with said second protocol, said switch resumes processing of received multicast messages in accordance with said first mode of operation.

11. A method for use with at least one switch, said method comprising:

initializing said switch to process multicast messages in accordance with a first mode of operation of said switch associated with a first multicast protocol, said first mode of operation suppressing transmission of some multicast control messages;

receiving at least one multicast message that is in accordance with a second multicast protocol different from said first protocol;

processing, in response to receiving said at least one multicast message, other multicast messages received by said switch in accordance with a second mode of operation of said switch that is different from said first mode of operation, said second mode of operation not suppressing transmission of multicast control messages; and resuming processing of received multicast messages by said switch in accordance with said first mode of operation.

12. The method according to claim 11, further comprising:

suppressing transmission of multicast control messages in said first mode of operation for a predetermined time period, after which time at least one of the suppressed multicast control messages is transmitted.

13. A computer-readable media, comprising:

instructions for execution in a processor for the practice of a method, said method having the steps, initializing said switch to process multicast messages in accordance with a first mode of operation of said switch associated with a first multicast protocol, said first mode of operation suppressing transmission of some multicast control messages;

receiving at least one multicast message that is in accordance with a second multicast protocol different from said first protocol;

processing, in response to receiving said at least one multicast message, other multicast messages received by said switch in accordance with a second mode of operation of said switch that is different from said first mode of operation, said second mode of operation not suppressing transmission of multicast control messages; and resuming processing of received multicast messages by said switch in accordance with said first mode of operation.

14. The computer-readable media according to claim 13, further comprising instructions for suppressing transmission of multicast control messages in said first mode of operation for a predetermined time period, after which time at least one of the suppressed multicast control messages is transmitted.

15. Electromagnetic signals propagating on a computer network, comprising:

instructions for execution on a processor for the practice of a method, said method having the steps, initializing said switch to process multicast messages in accordance with a first mode of operation of said switch associated with a first multicast protocol, said first mode of operation suppressing transmission of some multicast control messages;

receiving at least one multicast message that is in accordance with a second multicast protocol different from said first protocol;

processing, in response to receiving said at least one multicast message, other multicast messages received by said switch in accordance with a second mode of operation of said switch that is different from said first mode of operation, said second mode of operation not suppressing transmission of multicast control messages; and resuming processing of received multicast messages by said switch in accordance with said first mode of operation.

16. The electromagnetic signals according to claim 15, further comprising instructions for suppressing transmission of multicast control messages in said first mode of operation for a predetermined time period, after which time at least one of the suppressed multicast control messages is transmitted.

\* \* \* \* \*

UNITED STATES PATENT AND TRADEMARK OFFICE
CERTIFICATE OF CORRECTION

PATENT NO. : 6,735,201 B1
DATED : May 11, 2004
INVENTOR(S) : Umesh Mahajan et al.

It is certified that error appears in the above-identified patent and that said Letters Patent is hereby corrected as shown below:

Delete Title page illustrating figure, and substitute therefor new Title page illustrating figure. (attached)

Delete drawing sheets 1-5, and substitute therefor drawing sheets 1-5, as shown on the attached sheet.

<u>Title page,</u>
Item [56], References Cited, U.S. PATENT DOCUMENTS, insert the following:

```
-- 4,821,265    4/1989     Albal et al.
   4,864,559    9/1989     Perlman
   4,893,302    1/1990     Hemmady et al.
   4,933,937    6/1990     Konishi
   4,942,518    7/1990     Weatherford et al.
   5,018,137    5/1991     Backes et al
   5,027,350    6/1991     Marshall
   5,088,032    2/1992     Bosack
   5,138,615    8/1992     Lamport et al.
   5,140,585    8/1992     Tomikawa
   5,157,774   10/1992     Culley
   5,210,850    5/1993     Kelly et al.
   5,247,639    9/1993     Yamahata
   5,247,642    9/1993     Kadlec et al.
   5,247,648    9/1993     Watkins et al.
   5,257,359   10/1993     Blasco et al.
   5,274,631   12/1993     Bhardwaj
   5,304,992    4/1994     Harashima
   5,305,311    4/1994     Lyles
   5,313,454    5/1994     Bustini et al.
   5,327,545    7/1994     Begun et al.
   5,361,256   11/1994     Doeringer et al.
   5,394,394    2/1995     Crowther et al.
   5,394,402    2/1995     Ross
   5,414,704    5/1995     Spinney
   5,418,779    5/1995     Yemini et al.
   5,420,862    5/1995     Perlman
   5,430,715    7/1995     Corbalis et al.
   5,473,607   12/1995     Hausman et al.
   5,500,860    3/1996     Perlman et al
   5,511,168    4/1996     Perlman et al.
   5,548,585    8/1996     Lagoutte et al.
   5,586,296   12/1996     Bernstein et al.
   5,602,841    2/1997     Lebizay et al.
   5,612,959    3/1997     Takase et al.
   5,617,421    4/1997     Chin et al.
   5,623,627    4/1997     Witt
   5,625,793    4/1997     Mirza
   5,633,858    5/1997     Chang et al
   5,633,869    5/1997     Burnett et al.
   5,636,216    6/1997     Fox et al.
   5,673,263    9/1997     Basso et al.
   5,673,265    9/1997     Gupta et al.
   5,684,800   11/1997     Dobbins et al.
   5,740,171    4/1998     Mazzola et al.
   5,742,604    4/1998     Edsall et al.
   5,752,003    5/1998     Hart
   5,752,274    5/1998     Garibay, Jr. et al.
```

UNITED STATES PATENT AND TRADEMARK OFFICE
CERTIFICATE OF CORRECTION

PATENT NO.     : 6,735,201 B1
DATED          : May 11, 2004
INVENTOR(S)    : Umesh Mahajan et al.

It is certified that error appears in the above-identified patent and that said Letters Patent is hereby corrected as shown below:

Title page (cont'd),

| | | |
|---|---|---|
| 5,754,547 | 5/1998 | Nakazawa |
| 5,764,636 | 6/1998 | Edsall |
| 5,778,422 | 7/1998 | Genduso et al. |
| 5,796,732 | 8/1998 | Mazzola et al. |
| 5,796,740 | 8/1998 | Perlman et al |
| 5,829,027 | 10/1998 | Goodrum |
| 5,835,720 | 11/1998 | Nelson et al. |
| 5,854,901 | 12/1998 | Cole et al. |
| 5,875,464 | 2/1999 | Kirk |
| 5,890,216 | 3/1999 | Derrick et al. |
| 5,901,286 | 5/1999 | Danknick et al. |
| 5,906,001 | 5/1999 | Wu et al. |
| 5,910,955 | 6/1999 | Nishimura et al. |
| 5,920,566 | 7/1999 | Hendel et al |
| 5,938,736 | 8/1999 | Muller, et al |
| 5,959,989 | 9/1999 | Gleeson et al. |
| 5,968,126 | 10/1999 | Ekstrom et al. |
| 5,982,773 | 11/1999 | Nishimura et al. |
| 5,999,536 | 12/1999 | Kawafuji et al. |
| 6,014,380 | 1/2000 | Hendel, et al |
| 6,055,236 | 4/2000 | Nessett et al. |
| 6,097,720 | 8/2000 | Araujo et al. |
| 6,104,695 | 8/2000 | Wesley et al. |
| 6,144,661 | 11/2000 | Katsube et al. |
| 6,147,993 | 11/2000 | Kloth, et al |
| 6,172,990 | 1/2001 | Deb et al |
| 6,208,649 | 3/2001 | Kloth |
| 6,505,253 | 1/2003 | Chiu et al. |
| 6,507,562 | 1/2003 | Kadansky et al. -- |

Insert the following:
-- OTHER PUBLICATIONS

IEEE, "Draft Standard for Virtual Bridged Local Area Networks," pp. 1-10 and 70-72 (May 1997)

Deering, S., and Cheriton, D., "Multicast Routing in Datagram Internetworks and Extended LANs," Vol. 8, ACM Transactions on Computer Systems, pp. 85-110 (May 1990)

Deering, S. et al., "An Architecture for Wide-Area Multicasting," Proceedings of SIGCOMM '94 Conf., ACM, pp. 126-135 (October 1994)

"Cisco VLAN Roadmap", http://www.cisco.com/warp/public/538/7.html, pp. 1-9, posted July 17, 1995

"Cisco Catalyst Workgroup Switch Version 3.0,"
http://www.cisco.com/warp/public/558/16.html, pp 1-5, posted August 29, 1994

"Virtual Networking Services,"
http://www.cisco.com/warp/public/614/5.html, pp 1-10, posted October 28, 1997

"Cisco LAN Switching Products,"
http://www.cisco.com/warp/public/534/16.html, pp 1-21, posted March 31, 1995

UNITED STATES PATENT AND TRADEMARK OFFICE
CERTIFICATE OF CORRECTION

PATENT NO. : 6,735,201 B1
DATED : May 11, 2004
INVENTOR(S) : Umesh Mahajan et al.

It is certified that error appears in the above-identified patent and that said Letters Patent is hereby corrected as shown below:

Title page (cont'd),

"Multicast Routing," http://www.cisco.com/warp/public/614/17.html, pp 1-3, posted August 3, 1995

"IP Multicast Streamlines Delivery of Multicast Applications," http://www.cisco.com/warp/public/674/4.html, pp 1-4, posted February 24, 1998

"Catalyst 1200 Release 4.0," http://www.cisco.com/warp/public/558/49.html, pp 1-7, posted May 18, 1995

"Cisco IOS VLAN Services," http://www.cisco.com/warp/public/614/11.html, pp 1-3, posted January 21, 1998

"Cisco IOS Technologies," http://www.cisco.com/warp/public/732/ciscoios.html, pp 1-2, 1997

"The Virtual LAN Technology Report," http://www.3com.com/nsc/200374.html, pp. 1-19, 1998

"ATM Internetworking," http://www.cisco.com/warp/public/614/12,html#LANE, pp. 1-58, posted June 1, 1995

Lucent's and Prominet's Motion for Leave To Amend Their Amended Complaint, with Exhibits being filed in Lucent Technologies, Inc. and Prominet Corporation v. Cisco Systems, Inc. and Cisco Technology, Inc.Civil Action No. 98-349 (JJF)

"Cisco Introduces VLAN Solution," Communications Industry Researchers, Broadband Networks and Applications, April 15, 1995

"Cisco Announces Token-Ring Switching Products," Communications Industry Researchers, Broadband Networks and Applications, April 15, 1995

"Chipcom and Cisco To Collaborate On ATM Networking Solutions," Communications Industry Researchers, Broadband Networks and Applications, April 15, 1995

"Cisco Announces New Fast Ethernet Interface," Communications Industry Researchers, Broadband Networks and Applications, April 15, 1995

Lucent Technologies, Inc.'s Initial Disclosure of Prior Art under Civil Local Rule 16-7, dated November 18, 1998

Intel 82434LX/82434NX PCI, Cache and Memory Controller (PCMC), December 1994, pages 60-104.

Cisco 7000 Series Gains Fast Ethernet Interface, Becomes Only Router Family to Support Three High-Speed Network Types,web, http://www.cisco.com/warp/public/146/199.html pgs. 1-2.

ISL Functional Specification, web, http://www.cisco.com/warp/public/741/4.htm, pgs. 1-4

UNITED STATES PATENT AND TRADEMARK OFFICE
CERTIFICATE OF CORRECTION

PATENT NO. : 6,735,201 B1
DATED : May 11, 2004
INVENTOR(S) : Umesh Mahajan et al.

It is certified that error appears in the above-identified patent and that said Letters Patent is hereby corrected as shown below:

Title page (cont'd),

```
Configuring VTP and Virtual LANs, Catalyst 5000 Series Software Con-
figuration Guide, Chapter 13, pgs.13-24.

Cisco-Catalyst 5000 Software Release 2.1 Feature Set, web,
http://www.cisco.com/warp/public/729/c5000/426_pp.htm, pgs. 1-9

IEEE Standard Project P802.1Q,Draft Standard for Virtual Bridged Local
Area Networks, Copyright by the Institute of Electrical and Electronics
Engineers, Inc.,February 28, 1997, pgs.1-88.

Draft Standard P. 802.1Q/D10, IEEE Standards for Local and Metropoli-
tan Area Networks: Virtual Bridged Local Area Networks, Copyright by
the Institute of Electrical and Electronics Engineers, Inc., March 22,
1997, pgs.1-212.

ISL Configurations for Cisco IOS and the Catalyst 5000, web,
http://www.cisco.com/warp/public/741/8.html, pgs. 1-8.

Dynamic Inter-Switch Link Protocol, 2.2 Configuration Note, pgs. 2-6

Virtual LANs, Catalyst 2820 Series and Catalyst 1900 Series Enterprise
Edition Software Configuration Guide, Chapter 2, pgs.2-1 -- 2-49.       --
```

Signed and Sealed this

Fourteenth Day of September, 2004

JON W. DUDAS
*Director of the United States Patent and Trademark Office*

(12) United States Patent
Mahajan et al.

(10) Patent No.: US 6,735,201 B1
(45) Date of Patent: May 11, 2004

(54) EFFICIENT NETWORK MULTICAST SWITCHING APPARATUS AND METHODS

(75) Inventors: Umesh Mahajan, Fremont, CA (US); Ramana Mellacheruvu, Sunnyvale, CA (US); Thomas J. Edsall, Mountain View, CA (US); Raymond Kloth, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/238,422

(22) Filed: Sep. 10, 2002

Related U.S. Application Data

(63) Continuation of application No. 09/167,682, filed on Oct. 7, 1998.

(51) Int. Cl.[7] .......................... H04L 12/28; H04L 12/56
(52) U.S. Cl. ....................................... 370/390
(58) Field of Search ................................ 370/389, 390, 370/400, 907, 465, 254

(56) References Cited

U.S. PATENT DOCUMENTS 6,101,180 A * 8/2000 Donahue et al. ............. 370/352
2003/0016624 A1 * 1/2003 Bare .......................... 370/217

* cited by examiner

Primary Examiner—Dang Ton
Assistant Examiner—Kevin C. Harper
(74) Attorney, Agent, or Firm—Cesari and McKenna, LLP

(57) ABSTRACT

Efficient switched network multicasting techniques are provided. Incoming multicast packets are processed by a central forwarding engine (CFE) in a network switch to generate forwarding indices used to make forwarding decisions for the packets based upon whether the packets are special multicast control packets or data packets. Forwarding of the special multicast control packets is determined by the switch's network management processor (NMP), while data packets are forwarded based upon conventional bridge forwarding techniques.

16 Claims, 5 Drawing Sheets